(12) United States Patent
Hadi

(10) Patent No.: US 10,539,000 B2
(45) Date of Patent: Jan. 21, 2020

(54) INSTRUMENTED SAVER SUB FOR STICK-SLIP VIBRATION MITIGATION

(71) Applicant: Nabors Drilling Technologies USA, Inc., Houston, TX (US)

(72) Inventor: Mahmoud Hadi, Richmond, TX (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 267 days.

(21) Appl. No.: 15/395,989

(22) Filed: Dec. 30, 2016

(65) Prior Publication Data

US 2018/0187539 A1    Jul. 5, 2018

(51) Int. Cl.
| | |
|---|---|
| *E21B 44/00* | (2006.01) |
| *E21B 12/00* | (2006.01) |
| *F16F 15/22* | (2006.01) |
| *E21B 44/04* | (2006.01) |
| *F16D 3/12* | (2006.01) |
| *E21B 3/035* | (2006.01) |

(52) U.S. Cl.
CPC .............. *E21B 44/00* (2013.01); *E21B 3/035* (2013.01); *E21B 12/00* (2013.01); *E21B 44/04* (2013.01); *F16D 3/12* (2013.01); *F16F 15/22* (2013.01)

(58) Field of Classification Search
CPC .......... E21B 44/00; E21B 3/035; E21B 44/04; E21B 12/00; F16F 15/22; F16D 3/12
See application file for complete search history.

(56) References Cited

U.S. PATENT DOCUMENTS

| 8,087,476 B2 | 1/2012 | Wassell et al. |
|---|---|---|
| 2011/0232966 A1* | 9/2011 | Kyllingstad ............ E21B 44/00 175/24 |
| 2016/0237802 A1* | 8/2016 | Boone ....................... E21B 7/06 |

FOREIGN PATENT DOCUMENTS

| CA | 2035823 | 2/1991 |
|---|---|---|
| WO | WO2010/064031 | 6/2010 |
| WO | WO2013/112056 | 8/2013 |
| WO | WO2014/147116 | 9/2014 |
| WO | WO2016/122329 | 8/2016 |

* cited by examiner

*Primary Examiner* — Yong-Suk Ro
(74) *Attorney, Agent, or Firm* — Haynes and Boone, LLP

(57) ABSTRACT

A drilling rig apparatus is disclosed for mitigating stick-slip using a saver sub that is compatible with different top drives. The saver sub includes a smart material adjustable whenever a stand is added to the drill string to have different spring characteristics to generally match the impedance of the top drive to the impedance of the drill string. The saver sub also includes a magneto rheological fluid that is adjusted whenever a stand is added to the drill string to compensate for the changed characteristics of the drill string. The damping constant implemented by the MR fluid enables the saver sub to absorb stick-slip vibrations at the top drive. Each time that a stand is connected to the drill string, the spring and damping constants may be updated to accommodate the changing characteristics of the drill string.

20 Claims, 6 Drawing Sheets

INSTRUMENTED SAVER SUB FOR STICK-SLIP VIBRATION MITIGATION

TECHNICAL FIELD

The present disclosure is directed to systems, devices, and methods for mitigating stick-slip in a wellbore. More specifically, the present disclosure is directed to systems, devices, and methods for mitigating stick-slip using an instrumented saver sub that is compatible across different top drives.

BACKGROUND OF THE DISCLOSURE

During rotary drilling, the torque applied at a top drive of a drilling rig is often out of phase with the rotational movement at the bottom-hole assembly (BHA) of the drill string due to an elasticity of the material of the drill string. This causes the drill string to yield somewhat under the opposing loads imposed by the rotational force at the top drive and friction/inertia at the end where the bit is located (e.g., the BHA). This causes undesirable resonant motion to occur between the top drive and the BHA. Further, as the drill string winds up along its length due to the ends being out of phase, the torque stored in the winding may exceed any static friction, causing the drill string near the bit to slip relative to the wellbore sides at a high (and often damaging) speed.

Current approaches to stick-slip mitigation adjust a rotation speed during the rotary drilling to reduce the chance of stick-slip and/or other vibrations. Thus, these approaches modulate top drive rotations per minute (RPM) to mitigate vibration occurring down hole. The modulation of RPM is done at the top drive and is based on configuring the top drive control system to match the impedance of the drill string. These approaches are therefore top-drive specific (or even, in some instances, variable frequency drive specific). As a result, settings at one top drive or variable frequency drive cannot be easily applied to a different top drive or variable frequency drive.

Other approaches to stick-slip mitigation provide damping materials down hole near the drill bit. However, these approaches address the issue by attempting to absorb vibration down at the drill bit, not by matching impedance at the top drive so as to prevent standing waves from reflecting back. Further, these approaches are more costly because any replacement requires tripping the entire drill string in order to access the BHA where these approaches are implemented.

The present disclosure is directed to systems, devices, and methods that overcome one or more of the shortcomings of the prior art.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
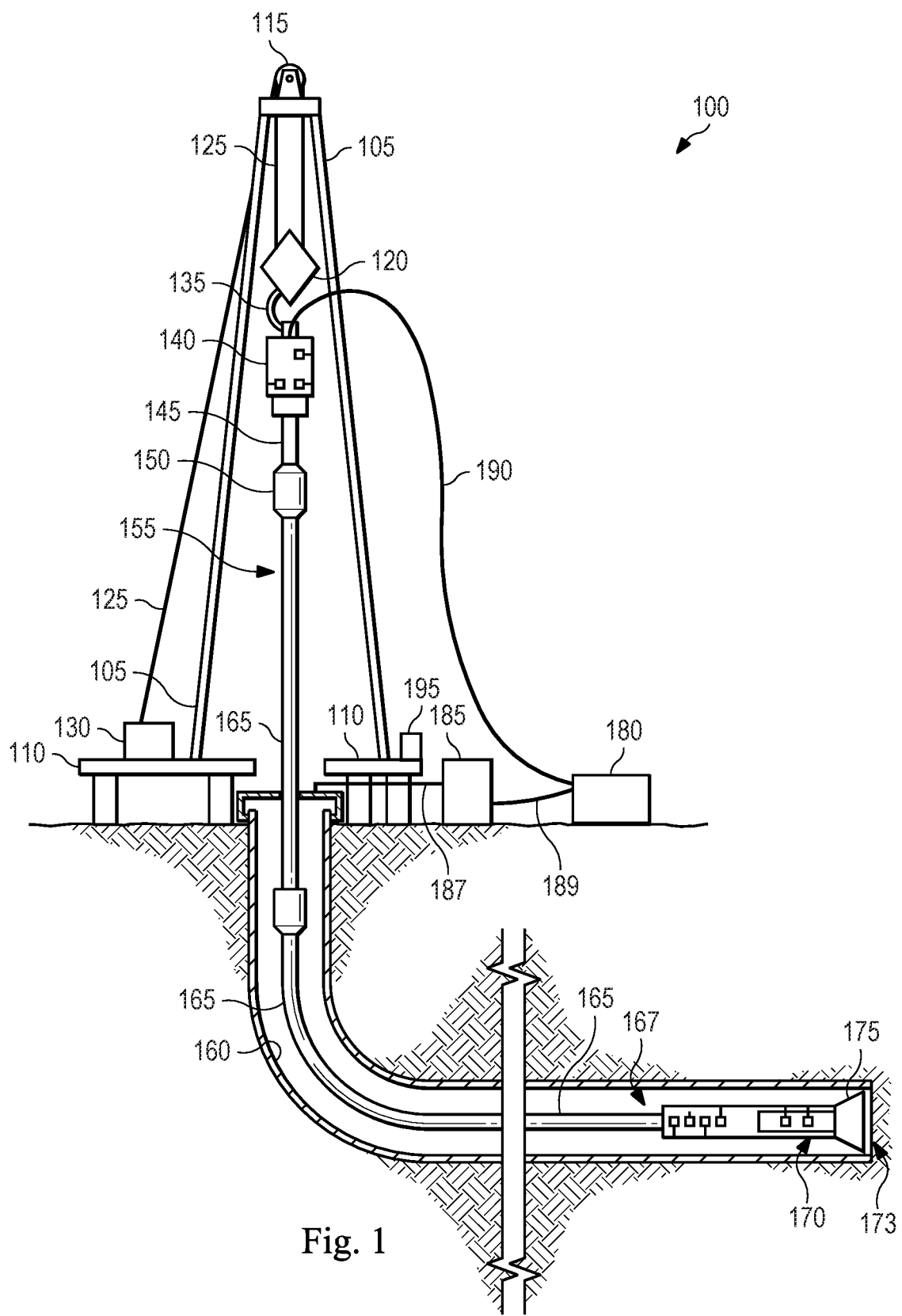
FIG. 1 is a schematic of an apparatus shown as an exemplary drilling rig according to one or more aspects of the present disclosure.

It is to be understood that the following disclosure provides many different embodiments, or examples, for implementing different features of various embodiments. Specific examples of components and arrangements are described below to simplify the present disclosure. These are merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

Embodiments of the present disclosure include a drilling rig apparatus for mitigating stick-slip using an instrumented saver sub that may be utilized with any of a variety of differently arranged top drives. In some implementations, the instrumented saver sub may include a smart material that may be adjusted to have different spring characteristics that may match the impedance of the top drive to which the instrumented saver sub is attached to the drill string. The smart material may be, for example and without limitation, a shape memory alloy or shape memory polymer. Some implementations of the instrumented saver sub may further include a magneto rheological fluid (MR fluid) that may be adjusted whenever a stand is added to the drill string to compensate for the changed characteristics of the drill string. The damping constant implemented by the MR fluid enables the instrumented saver sub to mechanically absorb all or a portion of stick-slip vibrations at the top drive to reduce the reflections of standing waves back down the drill string. Each time that a stand is connected to the drill string, the spring and damping constants may be updated to accommodate the changing characteristics of the drill string.

Some implementations of the instrumented saver sub may be tuned to the resonant frequency of the drill string every time that a new stand is connected to the drill string. As a result, stick-slip vibrations may be mitigated by the MR fluid's set properties in the saver sub. This approach of mitigating stick-slip may prolong the life of down-hole tools, require less tripping than existing approaches, and support more drilling. Further, embodiments of the present disclosure may provide a solution that may apply across different top drives that would otherwise require extensive reconfiguring and expensive control programming and set-up.

FIG. 1 is a schematic of a side view of an exemplary drilling rig 100 according to one or more aspects of the present disclosure. In some examples, the drilling rig 100 may form a part of a land-based, mobile drilling rig. However, one or more aspects of the present disclosure are applicable or readily adaptable to any type of drilling rig with supporting drilling elements, for example, the rig may include any of jack-up rigs, off-shore rigs, semisubmersibles, drill ships, coil tubing rigs, well service rigs adapted for drilling and/or re-entry operations, and casing drilling rigs, among others within the scope of the present disclosure.

The drilling rig 100 includes a mast 105 supporting lifting gear above a rig floor 110. The lifting gear may include a crown block 115 and a traveling block 120. The crown block 115 is coupled at or near the top of the mast 105, and the traveling block 120 hangs from the crown block 115 by a drilling line 125. One end of the drilling line 125 extends from the lifting gear to axial drive 130. In some implementations, axial drive 130 is a drawworks, which is configured to reel out and reel in the drilling line 125 to cause the traveling block 120 to be lowered and raised relative to the rig floor 110. The other end of the drilling line 125, known as a dead line anchor, is anchored to a fixed position, possibly near the axial drive 130 or elsewhere on the rig. Other types of hoisting/lowering mechanisms may be used as axial drive 130 (e.g., rack and pinion traveling blocks as just one example), though in the following reference will be made to axial drive 130 (also referred to simply as a drawworks herein) for ease of illustration.

A hook 135 is attached to the bottom of the traveling block 120. A drill string rotary device 140, of which a top drive is an example, is suspended from the hook 135. Reference will be made herein simply to top drive 140 for simplicity of discussion. A quill 145 extending from the top drive 140 is attached to a saver sub 150 configured according to embodiments of the present disclosure, which is attached to a drill string 155 suspended within a wellbore 160. The term "quill" as used herein is not limited to a component which directly extends from the top drive 140, or which is otherwise conventionally referred to as a quill. For example, within the scope of the present disclosure, the "quill" may additionally or alternatively include a main shaft, a drive shaft, an output shaft, and/or another component which transfers torque, position, and/or rotation from the top drive or other rotary driving element to the drill string, at least indirectly. Nonetheless, for the sake of clarity and conciseness, these components may be collectively referred to herein as the "quill." It should be understood that other techniques for arranging a rig may not require a drilling line, and are included in the scope of this disclosure.

According to embodiments of the present disclosure, the saver sub 150 may include smart materials that are configurable to detect and mitigate stick slip vibrations as they traverse the drill string 155. In some implementations, the smart material may include a shape memory alloy that functions as a spring and a magneto rheological (MR) fluid that functions as a damper within the system of the saver sub 150. The spring, using the smart material, may have its spring constant (K) changed each time the composition of the drill string 155 changes so as to match the impedance of the top drive 140 to the impedance of the drill string 155 at a given length. For example, the longer the drill string 155, the softer or lower the spring constant. Likewise, as the drill string 155 lengthens, the spring constant increases. The damper, using the MR fluid, may have its damping constant (C) changed as well each time that the composition of the drill string 155 changes to better absorb standing waves on the drill string 155 for the given length, and thereby mitigate stick-slip. In some embodiments, another saver sub without instrumentation or components according to embodiments of the present disclosure may be inserted after the saver sub 150 (that includes the spring and damping aspects) between the saver sub 150 and the drill string 155. This may provide an intermediary between the saver sub 150 and the drill string 155 to protect the saver sub 150 from some forms of damage.

The drill string 155 includes interconnected sections of drill pipe 165, a bottom hole assembly (BHA) 170, and a drill bit 175 for drilling at bottom 173 of the wellbore 160. The BHA 170 may include stabilizers, drill collars, and/or measurement-while-drilling (MWD) or wireline conveyed instruments, among other components. The drill bit 175 is connected to the bottom of the BHA 170 or is otherwise attached to the drill string 155. In the exemplary embodiment depicted in FIG. 1, the top drive 140 is utilized to impart rotary motion to the drill string 155. However, aspects of the present disclosure are also applicable or readily adaptable to implementations utilizing other drive systems, such as a power swivel, a rotary table, a coiled tubing unit, a downhole motor, and/or a conventional rotary rig, among others.

A mud pump system 180 receives the drilling fluid, or mud, from a mud tank assembly 185 and delivers the mud to the drill string 155 through a hose or other conduit 190, which may be fluidically and/or actually connected to the top drive 140. In some implementations, the mud may have a density of at least 9 pounds per gallon. As more mud is pushed through the drill string 155, the mud flows through the drill bit 175 and fills the annulus 167 that is formed between the drill string 155 and the inside of the wellbore 160, and is pushed to the surface. At the surface the mud tank assembly 185 recovers the mud from the annulus 167 via a conduit 187 and separates out the cuttings. The mud tank assembly 185 may include a boiler, a mud mixer, a mud elevator, and mud storage tanks. After cleaning the mud, the mud is transferred from the mud tank assembly 185 to the mud pump system 180 via a conduit 189 or plurality of conduits 189. When the circulation of the mud is no longer needed, the mud pump system 180 may be removed from the drill site and transferred to another drill site.

The drilling rig 100 also includes a control system 195 configured to control or assist in the control of one or more components of the drilling rig 100. For example, the control system 195 may be configured to transmit operational control signals to the drawworks 130, the top drive 140, the saver sub 150, the BHA 170 and/or the mud pump system 180. The control system 195 may be a stand-alone component installed somewhere on or near the drilling rig 100, e.g. near the mast 105 and/or other components of the drilling rig 100, or on the rig floor to name just a few examples. In some embodiments, the control system 195 is physically displaced at a location separate and apart from the drilling rig, such as in a trailer in communication with the rest of the drilling rig. As used herein, terms such as "drilling rig" or "drilling rig apparatus" may include the control system 195 whether located at or remote from the drilling rig 100.

According to embodiments of the present disclosure, the control system 195 may include, among other things, an interface configured to receive inputs from an operator whenever new drill pipe 165 (e.g., arranged in stands) is added to the drill string 155 (or when drill pipe 165 is removed from the drill string 155). For example, upon new drill pipe 165 being added to the drill string 155 (i.e., each time the composition of the drill string 155 changes), the operator of the control system 195 may input one or more parameters corresponding to the spring constant (K) and the damping constant (C) for the saver sub 150 according to embodiments of the present disclosure.

The saver sub 150 may receive the spring constant (K) and damping constant (C) in the form entered by the operator of the control system 195 (e.g., by wired and/or wireless connection(s)), and use an internally stored translation table (or other translation mechanism(s)) to determine a current to apply to the smart material to achieve the spring constant (K) and a magnetic field to apply to the MR fluid to achieve the damping constant (C) specified. Alternatively, the control system 195 may make that translation (or the values entered by the operator may identify these parameters directly) and convey the commands to the saver sub 150 for implementation.

In other embodiments, the control system 195 may include automatic tracking of the drill string 155 (and the drill pipe 165 more generally), so that each time a tubular or stand is added to, or removed from, the drill string 155 it is automatically tracked by the control system 195. In such embodiments, the control system 195 automatically check an internally stored database that relates different drill string lengths (or number of tubulars, etc.) to different spring constants (K) and damping constants (C). Each time that a tubular is added to the drill string 155, for example, the control system 195 may update its internal tracking of tubulars and of the drill string 155 in particular, and check what the spring constant (K) and damping constant (C) for that new length should be according to the established relationships. Those constants may be compared to what is currently set for the saver sub 150 and, when not equal, the control system 195 may send the new constant values to the saver sub 150 for implementation (i.e., changing the material properties of the shape-memory alloy and the magnetic field controlling the MR fluid).

Whether performed under the supervision and input of an operator or automatically, according to embodiments of the present disclosure the saver sub 150 receives updated values and/or commands each time that a change to the drill string 155 occurs, in response to which the saver sub 150 changes its spring properties to match the new impedance of the drill string 155 and its damping properties to better absorb/not reflect standing waves during drilling. Thereby, a stick-slip mitigation system that is portable across top drives 140 from different manufacturers is provided that also avoids the cost and burden of tripping as is the case with downhole vibration management approaches.

Figure 2A:
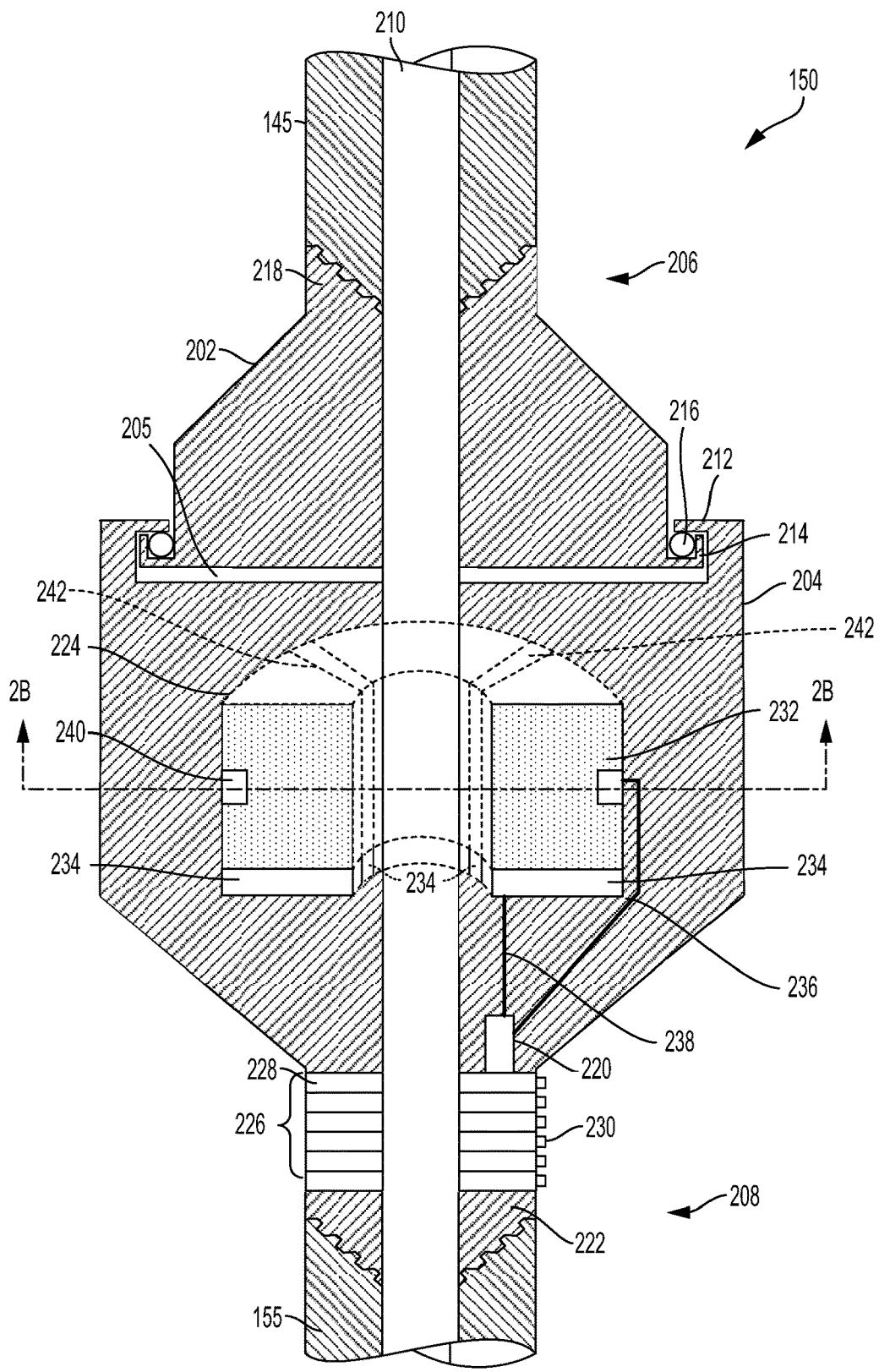
FIG. 2A is a side view cross-section of an exemplary instrumented saver sub according to one or more aspects of the present disclosure.

Turning to FIG. 2A, a side view cross-section of an exemplary instrumented saver sub 150 according to one or more aspects of the present disclosure is illustrated. In FIG. 2A, the saver sub 150 is illustrated while coupled with a quill 145 and a drill string 155, such as is illustrated in FIG. 1 above. The saver sub 150 illustrated in FIG. 2A may be useful in addressing stick-slip vibrations using a torsional approach, to name an example.

A fluid passage 210 extends through the quill 145, the saver sub 150, and the drill string 155 as illustrated. The fluid passage 210 allows the passage of fluids, such as drilling mud. As illustrated, the saver sub 150 includes as its body a proximal body portion 202 at a proximal end 206 coupled to the quill 145 (and, thereby, the top drive 140 in FIG. 1), and a distal body portion 204 at a distal end 208 coupled to the drill string 155. At the proximal end 206, a box 218 of the saver sub 150 is threaded to threadably engage with a pin of the quill 145. At the distal end 208, a pin 222 of the saver sub 150 is threaded to threadably engage with a box of the drill string 155 (i.e., a box of a tubular in the drill string 155).

The saver sub 150 illustrated in FIG. 2A may further include a rotational interface that, in an exemplary implementation, may be formed of a roller bearing 216 between the proximal body portion 202 and the distal body portion 204 that is able to support an axial load along the axis of the drill string 155. As illustrated, a roller bearing 216 is illustrated on each side of the cross-section of FIG. 2A; any number of roller bearings 216 may be placed along the circumference of the saver sub 150. The proximal body portion 202 may include a ledge 214 that extends beyond the main portion of the proximal body portion 202 with a width as large as or larger than a diameter of each roller bearing 216. The ledge 214 may extend around the circumference of the proximal body portion 202. The ledge 214 may extend underneath and extend up again towards the proximal end 206 to house the roller bearings 216 and support the axial load along the axis of the drill string 155. Further, the distal body portion 204 may include a lip 212 that extends above the roller bearings 216 on the ledge 214 and back toward the main portion of the proximal body portion 202 without contact. The lip 212 may further aid in housing the roller bearings 216 so that they remain with the saver sub 150. As configured, the proximal body portion 202 and the distal body portion 204 may be suspended from each other with a small gap 205 between them supported by the roller bearings 216.

As illustrated, the saver sub 150 also includes a slip ring 226 to transfer power and commands between a control circuit 220 in the distal body portion 204 (as illustrated; the control circuit 220 may be located in other parts of the saver sub 150 with appropriate connections) of the saver sub 150. In FIG. 2A, the slip ring 226 is illustrated at the proximal end 206; this is one of many options of where the slip ring 226 may be located on the saver sub 150. The slip ring 226 may include cores 228 and contacts 230. For example, there may be a plurality of cores 228 surrounding the fluid passage 210 and exposed to the outside of the distal body portion 204, and therefore the contacts 230. The cores 228 are composed of a conductive material, such as a metal. The contacts 230 may be brushes or other forms of contact fingers that are held in contact against the cores 228 while the cores 228 rotate with the rest of the saver sub 150 (and drill string 155). Through that contact, power and signals may be transferred (both to and from the saver sub 150). Each core 228 may have a corresponding contact 230, where each core/contact pair may be tasked with a different purpose, such as for power and different signals. Although illustrated as coupled to the distal body portion 204, the slip ring 226 may alternatively be located elsewhere, such as coupled to the proximal body portion 202.

Although illustrated as in physical contact, the slip ring 226 may alternatively be an inductive slip ring where power may be transferred via induction between a transmitting end external (and not touching) to the saver sub 150 and a receiving end attached to or integrated with the saver sub 150. Signals may also be transmitted using this inductive connection, although other wireless or wired connections may also be used therefore. As another alternative, the saver sub 150 may not include a slip ring 226 at all, but instead rely upon a battery for power that is replaced when it runs out, or which may be recharged from existing wireless signaling to the saver sub 150 (or other nearby components).

The control circuit 220 may be an integrated circuit or other type of circuit with either specifically configured hardware for the functions described herein, or a general purpose processor programmed and configured for those functions (or some subset thereof). The control circuit 220 may include a processor, a memory, and a transceiver to communicate with external components, such as with the slip ring 226 (i.e. with control system 195 via slip ring 226) and the smart material region 234 and components associated with the MR fluid 232 held in MR fluid reservoir 224, such as the electromagnet 240. In some embodiments, the memory of the control circuit 220 includes a look-up table or other form of database that maps spring and damping constants to control currents for the smart material region 234 and the electromagnet 240 respectively.

The control circuit 220 is in electrical contact with electromagnet 240 (e.g., an electromagnet coil) via path 236 (e.g., a wired and/or wireless connection) and with smart material region 234 (e.g., a region of the saver sub 150 configured with a shape-memory alloy with conducting elements reaching through portions of the smart material region 234) via path 238 (e.g., a wired and/or wireless connection). Although illustrated as located near the distal end 208 of the saver sub 150, the control circuit 220 may be located at various locations of the saver sub 150, including external to the proximal/distal body portions 202/204 in some embodiments.

Smart material region 234 is a region used to tune the saver sub 150 to the resonant frequency of the drill string 155—to match impedance to that of the drill string 155—each time that new drill pipe 165 is added to the drill string 155. As illustrated, the smart material region 234 may be located beneath the MR fluid reservoir 224, coupled to various locations of the underside of the MR fluid reservoir 224. In some embodiments, the smart material region 234 may be a continuous formation beneath the MR fluid reservoir 224, while in other embodiments the smart material region 234 may be a collection of discrete regions, e.g. located beneath and coupled to the regions of the MR fluid reservoir 224 where the separators 242 are located, as discussed further below with respect to FIG. 2B.

Smart material region 234 may be a shape-memory alloy or a shape-memory polymer, to name a few examples (e.g., all of the same material or multiple layers of different and/or repeating patterns of alloys/materials to achieve a desired combination of properties). For example, the smart material region 234 may be a shape-memory alloy such as copper-aluminum-nickel or nickel-titanium, or some other alloy or shape-memory polymer. When a new stand, for example, is added to the drill string 155, a command (whether a spring constant value, current value, or other command) may be received by the control circuit 220 that is intended to cause the control circuit 220 to apply a current to the smart material region 234 (e.g., via the path 238 that may extend throughout the smart material region 234) that changes the temperature of the smart material region 234. With that change in temperature, crystalline structure within the smart material region 234 may change as well based on the material properties of the smart material region 234. Thereafter, the smart material region 234 may assume the material properties and remain in that condition until current is applied again.

The MR fluid 232 is maintained within the MR fluid reservoir 224, which may be sealed from the rest of the distal body portion 204 as well as from the electromagnet 240 by a flexible or inflexible barrier, shield, or saver sub material. As illustrated, the MR fluid reservoir 224 is coupled to the electromagnet 240 and surrounds the fluid passage 210. The cross section of FIG. 2A illustrates the MR fluid 232 in the MR fluid reservoir 224. The MR fluid reservoir 224 may include multiple separators 242 that will be discussed in more detail with respect to FIG. 2B below. In the presence of a magnetic field, such as one of varying strength generated by the electromagnet 240, the MR fluid 232 changes its viscosity, e.g. increasing in response to an increase in the strength (intensity) of the magnetic field. By varying the intensity of the magnetic field, the viscosity of the MR fluid 232 may be controlled to achieve a desired damping ratio.

Continuing with the example of the new stand being added, a command (whether damping constant value, current or voltage value, or other command) may be received by the control circuit 220. The control circuit 220 may, in embodiments, translate the command into a size of magnetic field for the electromagnet 240 to generate, thereby achieving a desired damping ratio in the MR fluid reservoir 224. In response, the control circuit 220 may generate a current to the electromagnet 240 (e.g., via the path 236) that imposes the desired magnetic field intensity to the MR fluid 232. The control circuit 220 may thereafter maintain that level of current to the electromagnet 240 until a new command is received at the control circuit 220, at which time the control circuit 220 implements the new command.

Figure 2B:
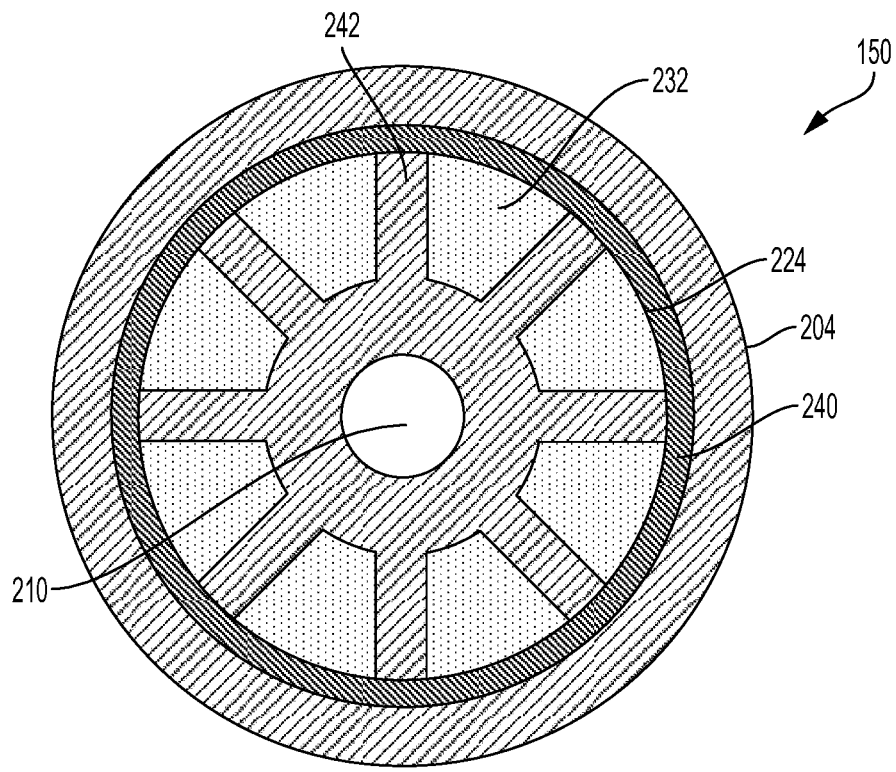
FIG. 2B is a top view cross-section of an exemplary instrumented saver sub according to one or more aspects of the present disclosure.

FIG. 2B is a top view cross-section of an exemplary instrumented saver sub 150, in particular a horizontal cross section of the saver sub 150 illustrated in FIG. 2A along the line 2B-2B. Thus, FIG. 2B provides a top view of the cross section of the distal body portion 204 of the saver sub 150 from FIG. 2A taken across the portion of the distal body portion 204 where the MR fluid reservoir 224 is located.

As illustrated in FIG. 2B, the center of the cross section is the fluid passage 210, which is not necessarily drawn to scale in order to better view certain aspects of the present disclosure. There are a plurality of separators 242 that separate the MR fluid 232 within the MR fluid reservoir 224 (referring to all sections that contain MR fluid 232). As illustrated, there are 8 separators 242, but this is exemplary—there may be more or fewer.

Figure 2C:
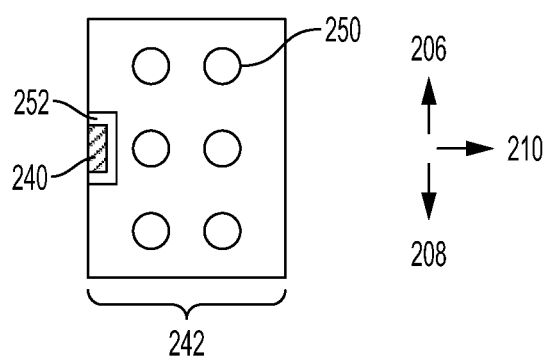
FIG. 2C is a side view of aspects of an exemplary instrumented saver sub according to one or more aspects of the present disclosure.

Turning to FIG. 2C, a side view of an exemplary separator 242 is illustrated. The top of the separator 242 is in the direction of the proximal end 206 of FIG. 2A, the bottom of the separator 242 is in the direction of the distal end 208 of FIG. 2A, and the right side (looking directly at the figure) of the separator 242 extends in the direction of the center of the saver sub 150, where the fluid passage 210 is located.

As illustrated, the exemplary separator 242 in FIG. 2C includes a plurality of MR fluid gaps 250 (illustrated as holes, though any shape may be used). Further, an opening 252 is located where the electromagnet 240 (e.g., isolated by a barrier from the MR fluid 232) passes through the exemplary separator 242, such as is also illustrated in FIG. 2A. The opening 252 may allow MR fluid 232 to pass through, or may be in contact with the electromagnet 240. The location of the electromagnet 240 in FIGS. 2A-2C is exemplary; the electromagnet 240 may be placed in some other location to provide a magnetic field to control the MR fluid 232 according to a command received by the control circuit 220, as discussed above for example. Further, in some embodiments the electromagnet 240 may be a continuous unit extending around a circumference of the saver sub 150, while in other embodiments the electromagnet 240 may be a plurality of electromagnets placed at different locations proximate to the MR fluid 232 (e.g., at intervals around a circumference.

The separators 242 may function as baffles to the MR fluid 232 within the MR fluid reservoir 224. Some MR fluid 232 may be allowed to pass through the fluid gaps 250 within the MR fluid reservoir 224 (also depending on the viscosity of the MR fluid 232 based on the intensity of magnetic field applied by the electromagnet 240 at a point in time). Further, as the viscosity of the MR fluid 232 increases, the separators 242 operate to provide an opposing force against the MR fluid 232 as vibrations from the drill string 155 reach the saver sub 150. In this way, depending upon the damping constant currently being translated into a magnetic field by the control circuit 220 and electromagnet 240, and in response to an impedance of the drill string 155 being matched by the present spring constant effectuated by the smart material region 234.

Returning to FIG. 2B, the plurality of separators 242 extend from a portion of the distal body portion 204 surrounding the fluid passage 210 to an outer radius of the distal body portion 204 (e.g., with some width of distal body portion 204 remaining between the outer edge of the separators 242/MR fluid reservoir 224 and the outside radius of the distal body portion 204). With the separators 242, the MR fluid gaps 250, the MR fluid 232, and the electromagnet 240, the saver sub 150 of FIGS. 2A-2C is configured to mitigate stick-slip vibrations arising from torsional sources.

Figure 3:
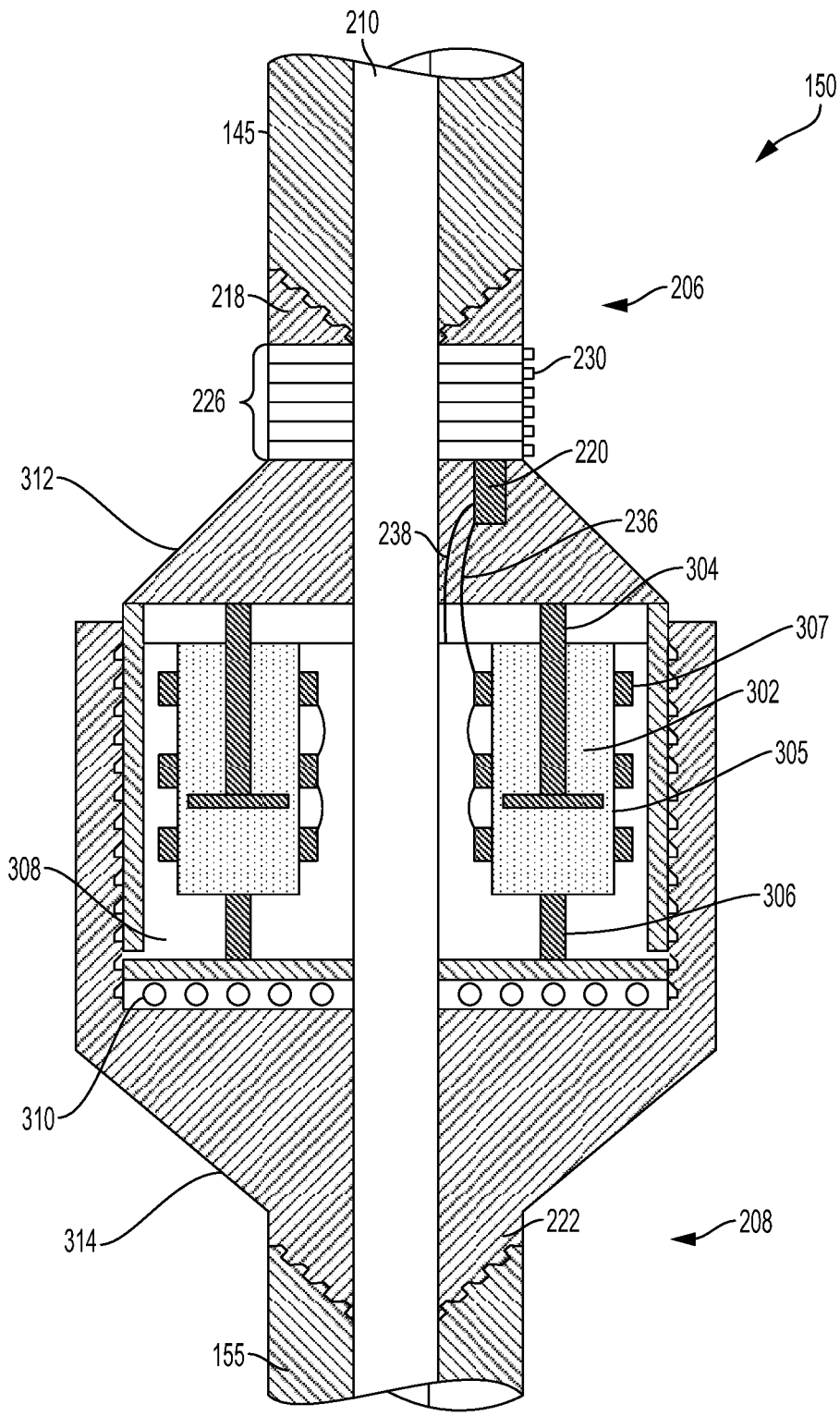
FIG. 3 is a side view cross-section of an exemplary instrumented saver sub according to one or more aspects of the present disclosure.

Other configurations are also possible for implementing the saver sub 150 according to the present disclosure. For example, FIG. 3 is a side view cross-section of an exemplary instrumented saver sub 150 according to one or more aspects of the present disclosure as an alternative to the one introduced in FIG. 2A above. In FIG. 3, the saver sub 150 is again illustrated as coupled with a quill 145 and a drill string 155, such as is illustrated in FIG. 1. The saver sub 150 illustrated in FIG. 3 may be useful in addressing stick-slip vibrations using a linear approach, to name an example. For example, the saver sub 150 illustrated in FIG. 3 may translate torsional motion traveling the drill string 155 into vertical (linear) compensatory movement at the saver sub 150.

A fluid passage 210 extends through the quill 145, the saver sub 150, and the drill string 155. The saver sub 150 further includes as its body a male portion 312 and a female portion 314, a proximal end 206 that is part of the male portion 312 coupled to the quill 145 (and, thereby, the top drive 140 in FIG. 1), and a distal end 208 that is part of the female portion 314 coupled to the drill string 155. The male portion 312 and the female portion 314 may be attached in a helicoid connection to each other via threads on the exterior surface of the male portion 312 and the interior surface of the female portion 314 as illustrated for example. Therefore, the threads on the interior surface of the female portion 314 may serve to guide telescoping movement between the male portion 312 and the female portion 314 based on the interaction with the corresponding threads on the male portion 312. At the proximal end 206, a box 218 is threaded to threadably engage with a pin of the quill 145. At the distal end 208, a pin 222 is threaded to threadably engage with a box of the drill string 155.

The saver sub 150 illustrated in FIG. 3 also includes a slip ring 226 to transfer power and commands between a control circuit 220 in the body (male portion 312 illustrated in FIG. 3) of the saver sub 150. In FIG. 3, the slip ring 226 is illustrated at the proximal end 206 with the male portion 312; this is one of many options of where the slip ring 226 may be located on the saver sub 150. The slip ring 226 may be one of the examples/alternatives discussed above with respect to FIG. 2A.

The saver sub 150 in FIG. 3 further includes a smart material region 308, for example surrounding the MR fluid reservoir 305. For example, there may be a different smart material region 308 for each respective MR fluid reservoir 305. In some implementations, the saver sub 150 may include a plurality of reservoirs 305. In some implementations, there may be 10-20 reservoirs 305 arranged around the center where the fluid passage 210 is located. Other implementations have more or fewer reservoirs 305. An exemplary implementation includes ten reservoirs 305. In some implementations, the plurality of MR fluid reservoirs 305 may be surrounded by the same smart material region 308. The control circuit 220 may be in communication with and coupled to the smart material region 308 via the path 238 (e.g., a wired and/or wireless connection). The smart material region 308 may be configured according to one or more of the aspects discussed above with respect to FIG. 2A.

Focusing on one MR fluid reservoir 305 for purposes of discussion, the MR fluid reservoir 305 may house MR fluid 302. At a proximal end of the MR fluid reservoir 305 may be located a plunger 304 that extends into the MR fluid reservoir 305. In the implementation shown, the plunger 304 is coupled to the male portion 312 of the saver sub 150. At a distal end of the MR fluid reservoir 305, a support 306 may be located that couples the MR fluid reservoir 305 to the female portion 314 of the saver sub 150. The MR fluid reservoir 305, in combination with the plunger 304 and the support 306 may collectively be referred to as a piston herein.

As illustrated, any given MR fluid reservoir 305 may have one or more electromagnets 307 surrounding it (e.g., isolated from the MR fluid 302). The illustrated example has three electromagnets 307 surrounding (e.g., rings) a given MR fluid reservoir 305 at spaced intervals along the longitudinal axis (parallel to the axis of the drill string 155) of the piston (MR fluid reservoir 305). This is exemplary only; more or fewer than three electromagnets 307, and of varying sizes, may alternatively be used. Further, the electromagnets 307 may be discrete lengths that do not span the length of the outside edge of the MR fluid reservoir 305, but that are nonetheless coupled to each other via one or more conducting paths (e.g., wired or wireless connections) and to the path 236 to the control circuit 220. Although illustrated as located near the proximal end 206 of the saver sub 150 in FIG. 3 as well, the control circuit 220 may be located at various locations of the saver sub 150, likely in the male portion 312. In embodiments where the control circuit 220 is located in the female portion 314, communication to the components in the male portion 312 may occur via wired or wireless connections to a transceiver remaining in the male portion 312 (in such embodiments).

The saver sub 150 illustrated in FIG. 3 may further include a thrust bearing 310 between the male portion 312 and the female portion 314 that is able to support an axial load along the axis of the drill string 155. In operation, as stick-slip vibrations reach the surface and the saver sub 150 according to embodiments of the present disclosure, since the spring constant for the saver sub 150 is adjusted to match the impedance of the drill string 155 at a given length by the smart material region 308, the damping from the MR fluid reservoirs 305 (i.e., the pistons) absorbs the vibrations in an axial manner, thereby mitigating stick-slip. For example, when a vibration reaches the saver sub 150, the female portion 314 may telescope back via the helicoid connection towards the male portion 312, pressing the MR fluid 302 in the MR fluid reservoirs 305 against the plunger 304, and therefore against the male portion 312. After absorbing the vibration, the female portion 314 may extend again away from the male portion 312 via the helicoid connection to a biased position imposed by the combined spring and damping effects of the smart materials region 308 and the MR fluid 302 in the piston configuration.

Figure 4:
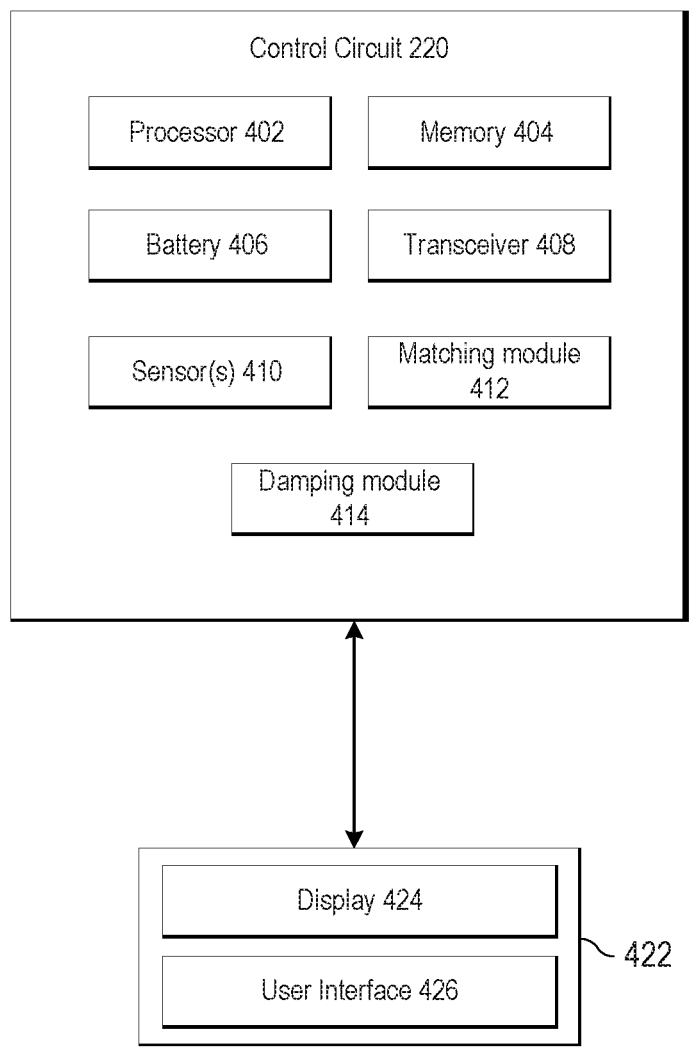
FIG. 4 is a block diagram of an apparatus shown as an exemplary control system according to one or more aspects of the present disclosure.

According to both the embodiments of FIGS. 2A-2C and 3, the saver sub 150 includes a control circuit 220. FIG. 4 illustrates a block diagram of an exemplary control system 400 according to one or more aspects of the present disclosure. In particular, FIG. 4 illustrates an exemplary control circuit 220 in communication with a human machine interface 422, such as a control interface of a drilling rig 100 (FIG. 1). Depending on the embodiment, these may be discrete components that are interconnected via wired and/or wireless connections. Together, these are referred to as the control system 400

The control circuit 220 includes a processor 402, a memory 404, a battery 406, a transceiver 408, one or more sensors 410, a matching module 412, and a damping module 414.

The processor 402 may have various features as a specific-type processor. For example, these may include a central processing unit (CPU), a digital signal processor (DSP), an application-specific integrated circuit (ASIC), a controller, a field programmable gate array (FPGA) device, another hardware device, a firmware device, or any combination thereof configured to perform the operations described herein with reference to the control circuit 220 introduced in FIG. 2A above. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In some embodiments, the memory 404 may include a non-transitory computer-readable medium.

The memory 404 may store instructions. The instructions may include instructions that, when executed by the processor 402, cause the processor 402 to perform operations described herein with reference to the control circuit 220 in connection with embodiments of the present disclosure. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The battery 406 may be any appropriately-sized battery (or other power source), such as a button cell battery to name an example. Generally, the battery 406 may be any power source capable of providing sufficient current to power the components of the saver sub 150 for a period of time. In some embodiments, the battery 406 may be rechargeable, such as via a wired or wireless connection to another power source, such as made possible by the slip ring 226 introduced with respect to FIG. 2A or some other inductive (wireless) mechanism.

The transceiver 408 may include a local area network (LAN), wide area network (WAN), Internet, satellite-link, and/or radio interface to communicate bi-directionally with other devices, such as the top drive 140, drawworks 130, BHA 170, and/or other networked elements. For example, the transceiver 408 may include multiple ports corresponding to the different connections/access technologies used to communicate between components and locations (e.g., different ports for communication connections via slip ring 226 and/or wireless connections, different sensors 410 of the saver sub 150, and the smart materials and electromagnets discussed above, any other suitable option, or any combination thereof).

The sensor(s) 410 may include one or more sensors integrated with, or coupled to, the saver sub 150. For example, the sensors 410 may include an axial load sensor that detects the load on the saver sub 150 between the top drive 140 and the drill string 155. Another sensor may include a rotary RPM sensor to sense rotations of the drill string 155 at the saver sub 150. Another sensor may include a rotary torque sensor that is configured to detect a value or range of the reactive torsion of the saver sub 150 (and/or the drill string 155 at the interface to the saver sub 150). Another sensor may include a surface pump pressure sensor or gauge. These are just a few examples of sensors 410 that may be implemented at the saver sub 150, which may include any other suitable option, or any combination thereof.

The matching module 412 may be used for various aspects of the present disclosure with respect to matching the impedance of the top drive 140 to the impedance of the drill string 155. The matching module 412 may include various hardware components and/or software components to implement the aspects of the present disclosure. For example, in some implementations the matching module 412 may include instructions stored in the memory 404 that causes the processor 402 to perform the operations described herein. In an alternative embodiment, the matching module 412 is a hardware module that interacts with the other components of the control circuit 220 to perform the operations described herein.

For example, as noted above, each time that a new stand (or, generally, a tubular) is added to the drill string 155, a user may enter a new spring constant (or command related to the spring constant, such as a new tracked number of stands, a selection from a drop-down menu, etc.) at the human machine interface 422. In some alternative embodiments where the tubulars of the drilling rig 100 are tracked automatically, this may be a spring constant accessed in a database based on the new number of stands in the drill string 155. Either way, the spring constant (or other command that identifies the spring constant) is relayed to the control circuit 220 at the saver sub 150 via wired or wireless connections (e.g., via the slip ring 226 or wireless connection) and the transceiver 408.

The processor 402 may, in response to receiving the new spring constant (or command), access an internally stored translation table (or other translation mechanism(s)) to determine a current to apply to the smart material to achieve the input spring constant (or other related command thereto). Alternatively, the control circuit 220 may receive a result of the translation and function to implement the determined current to manipulate the smart material to the desired configuration. According to some embodiments of the present disclosure, the current may be applied to change the properties of the smart material to achieve a different impedance matching property, and thereafter deasserted until another change is requested (e.g., a new stand is added to the drill string 155 and a new command entered).

The damping module 414 may be used for various aspects of the present disclosure with respect to damping vibrations from the drill string 155 related to stick-slip (e.g., standing waves, etc.) at the top drive 140, made possible in response to the spring properties of the smart material matching the impedance between the top drive 140 and the drill string 155 when new stands are added. The damping module 414 may include various hardware components and/or software components to implement the aspects of the present disclosure. For example, in some implementations the damping module 414 may include instructions stored in the memory 404 that causes the processor 402 to perform the operations described herein. In an alternative embodiment, the damping module 414 is a hardware module that interacts with the other components of the control circuit 220 to perform the operations described herein.

Continuing with the above example, in response to a new stand (or, generally, a tubular) being added to the drill string 155, and therefore changing the material properties of the drill string 155, a user may enter a new damping constant (or command related to the damping constant, such as a new tracked number of stands, a selection from a drop-down menu, etc.) at the human machine interface 422. This may alternatively be tracked automatically, as discussed above. Either way, the damping constant (or other command that identifies the damping constant) is relayed to the control circuit 220 at the saver sub 150 via wired or wireless connections (e.g., via the slip ring 226 or wireless connection) and the transceiver 408.

The processor 402 may, in response to receiving the new damping constant (or command), access an internally stored translation table (or other translation mechanism(s)) to determine a current to apply to the electromagnet that will impose a desired magnetic field intensity to achieve the input damping constant (or other related command thereto). Alternatively, the control circuit 220 may receive a result of the translation and function to implement the determined current to achieve the desired damping constant. According to some embodiments of the present disclosure, the current may be applied and maintained thereafter until another change is requested (e.g., a new stand is added to the drill string 155 and a new command entered), at which point the current may again change in response to the new command to achieve the new property of the MR fluid.

The control system 400 may also include a human machine interface 422. The human machine interface 422 includes a display 424 and a user interface 426. The human machine interface 422 may also include a memory and a processor as described above with respect to control circuit 220. In some implementations, the human machine interface 422 is separate from the control circuit 220. Further, the human machine interface 422 may include a user interface 426 with a simplified display 424 or, in some embodiments, not include the display 424.

The display 424 may be used for visually presenting information to the user in textual, graphic, or video form. The display 424 may also be utilized by the user to input drilling parameters and/or data corresponding to the spring constant and damping constant for the saver sub 150 to implement to adjust the impedance to which the saver sub 150 is matching as well as the damping level to vibrations according to embodiments of the present disclosure. For example, the input mechanism may be integral to or otherwise communicably coupled with the display 424. The input mechanism of the user interface 426 may also be used to input additional settings or parameters.

The input mechanism of the user interface 426 may include a keypad, voice-recognition apparatus, dial, button, switch, slide selector, toggle, joystick, mouse, data base and/or other conventional or future-developed data input device. Such a user interface 426 may support data input from local and/or remote locations. Alternatively, or additionally, the user interface 426 may permit user-selection of predetermined spring and damping constant values, such as via one or more drop-down menus. The data may also or alternatively be selected by the control circuit 220 or another controller in the system based on automatic tracking of the number of stands in the drill string 155 over time, accessible for example via the execution of one or more database look-up procedures. In general, the user interface 426 and/or other components within the scope of the present disclosure support operation and/or monitoring from stations on the rig site as well as one or more remote locations with a communications link to the system, network, LAN, WAN, Internet, satellite-link, and/or radio, among other means.

Figure 5:
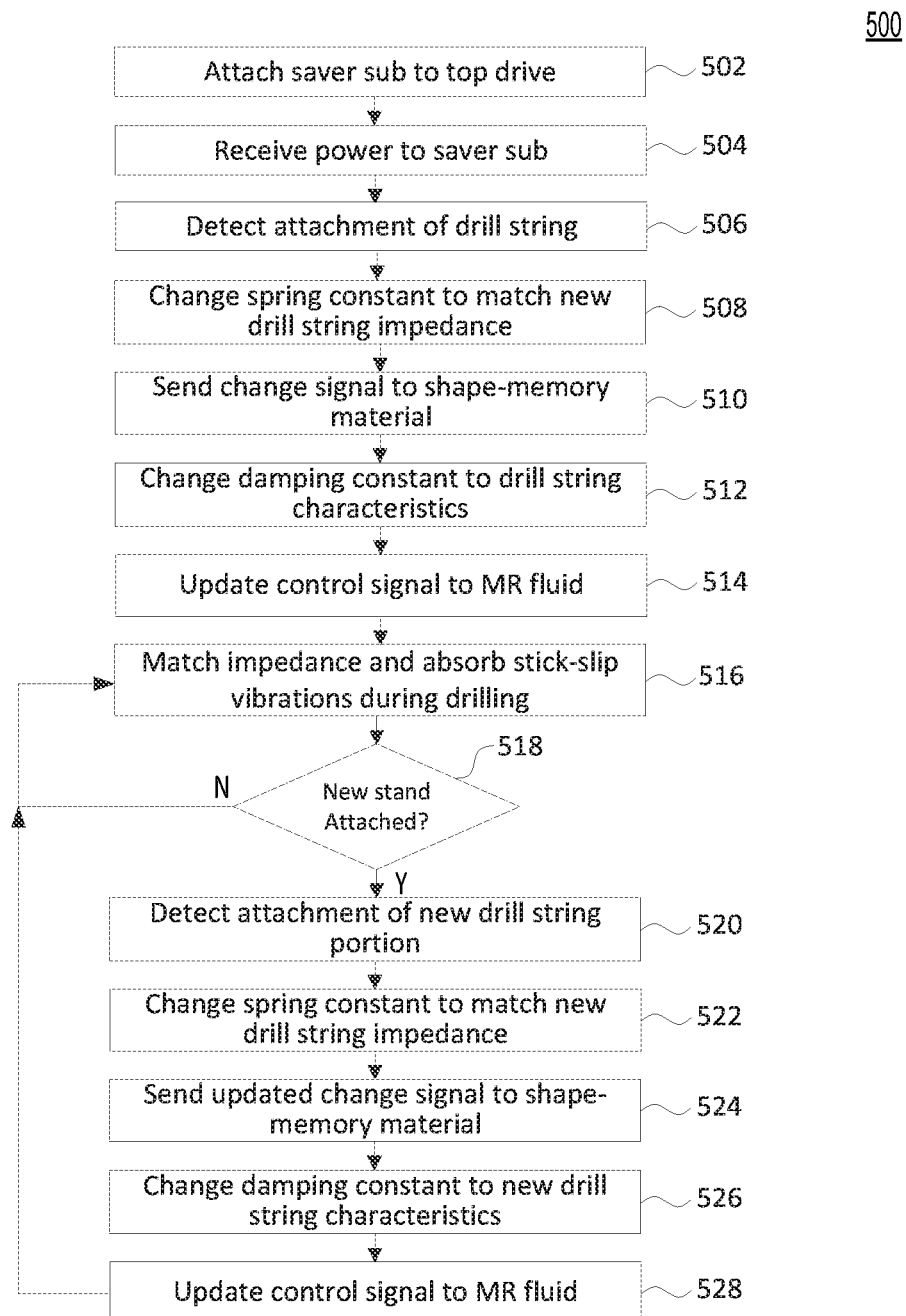
FIG. 5 is a flow chart showing an exemplary process for mitigating stick-slip vibrations with an instrumented saver sub according to aspects of the present disclosure.

Turning now to FIG. 5, an exemplary flow chart showing an exemplary method 500 for mitigating stick-slip vibrations with an instrumented saver sub according to aspects of the present disclosure is illustrated. The method 500 may be performed, for example, with respect to the saver sub 150 discussed above with respect to FIG. 1, 2A-2C, or 3. For purposes of discussion, reference in FIG. 5 will be made to saver sub 150 of FIG. 1. It is understood that additional steps can be provided before, during, and after the steps of method 500, and that some of the steps described can be replaced or eliminated from the method 500.

At block 502, a saver sub 150 is attached to the top drive 140 so that they are coupled together (e.g., threadably).

At block 504, the saver sub 150 receives power. In some embodiments, this may be supplied by one or more batteries within or attached to the saver sub 150. In other embodiments, this may be supplied by an external power supply that provides the power via a slip ring, inductive power transfer connection, etc. This may be combined with the battery aspect to provide a combination of power from the external source and the battery at different times/under different conditions/etc.

At block 506, the attachment of a drill string 155 is detected. This may be, for example, an operator of the system (e.g., control system 195) entering into an interface a stand (or more generally a tubular) count update, such as when a first stand is attached to the BHA 170 as the drill string 155 attached to the saver sub 150. This may alternatively be an automatic detection by a control system of the drilling rig 100. This may also include identifying and entering, or retrieving from storage, stand or tubular specifications specific to the stand or tubulars being used. This may include, for example, diameter, length, material, and other known tubular specifications.

At block 508, the value of the spring constant of the smart material of the saver sub 150 is changed in the control system. This is done in order to cause the smart material to have a spring constant characteristic that results in the impedance of the top drive 140 to generally match the impedance of the drill string 155 based on the drill string 155's current properties (i.e., the impedance of the drill string 155 at its current length). The value of the spring constant may be manually entered by a user of the control system 195, or alternatively be automatically determined/ generated by the control system 195 where the stand count is tracked by the system, not the user.

At block 510, in response to the change in the spring constant value from block 508, the control system 195 (or control circuit 220, where that is separate from control system 195 and in communication therewith) may modify the physical characteristic of the saver sub 150 so that the actual spring constant aligns with the changed (and target) spring constant value. This may be done by sending a change signal from the control system 195 to the smart material of the saver sub 150 (e.g., a shape memory alloy or shape memory polymer). The signal may be a current generated from the control circuit 220 of the saver sub 150. The current may trigger a change in the material properties of the smart material and, after the change occurs so that the material properties of the smart material exhibits the desired spring constant value entered at block 508, the control circuit 220 may end the signal until a change occurs later (e.g., at block 518).

At block 512, the damping constant value of the MR fluid in the saver sub 150 is changed in the control system 195 in response to the change in the drill string characteristics. This is done in order to cause the MR fluid to have a damping characteristic that results in absorbing/mitigating vibrations/ standing waves from the drill string 155 in its new configuration. The damping constant value may be manually entered by a user of the control system 195, or alternatively be automatically determined/generated by the control system 195 where the stand count is tracked by the system, not the user.

At block 514, the control signal from the control circuit 220 to the MR fluid (i.e., to the electromagnet controlling the MR fluid) is updated to achieve the new damping constant (i.e., where the control circuit 220 is part of the control system 195 or in communication with the control system 195). This may be maintained until another change to the drill string 155 as well as to the target damping constant occurs.

At block 516, in response to the changes to the spring and damping constants from blocks 508-514, during operation the impedance of the top drive 140 is matched generally to that of the drill string 155 in the current configuration, and stick-slip vibrations are absorbed as standing waves reach the saver sub 150.

At decision block 518, if a new stand (more generally, a tubular) is not attached yet, then the method 500 returns to block 516 and continues matching and absorbing according to characteristics of the current composition of the drill string 155.

If, instead, it is determined at block 518 that a new stand (or tubular) has been attached, then the method 500 proceeds to block 520. This determination, also referenced as a detection, may occur based on a manual entry of a new stand into the control system 195 by a user, or alternatively automatically by a control system that tracks and counts all tubulars in the system.

At block 520, the attachment of the new stand to the drill string 155 is detected. This may be, for example, an operator of the system (e.g., control system 195) entering into an interface a stand (or more generally a tubular) count update, such as when a first stand is attached to the BHA 170 as the drill string 155 attached to the saver sub 150. This may alternatively be an automatic detection by a control system of the drilling rig 100.

At block 522, the spring constant of the smart material of the saver sub 150 is changed again in response to the new stand being added to the drill string 155. This is done in order to cause the smart material to have a spring constant characteristic that results in the impedance of the top drive 140 being updated to again generally match the impedance of the drill string 155 based on the drill string 155's updated current properties (i.e., the impedance of the drill string 155 at its current, added length). The spring constant may be manually entered by a user of the control system 195, or alternatively be automatically determined/generated by the control system 195 where the stand count is tracked by the system, not the user.

At block 524, in response to the change in the spring constant from block 522, a change signal is sent to the smart material of the saver sub 150 (e.g., a shape memory alloy or shape memory polymer). The signal may again be a current generated from the control circuit 220 of the saver sub 150 that may trigger a change in the material properties of the smart material. After the change occurs, the control circuit 220 may end the signal until a change occurs later (e.g., again at block 518).

At block 526, the damming constant of the MR fluid in the saver sub 150 is changed in response to the additional change in the drill string characteristics from the addition of the stand to the drill string 155. This is done in order to cause the MR fluid to have a damping characteristic that results in absorbing/mitigating vibrations/standing waves from the drill string 155 in its new configuration. The damping constant may be manually entered by a user of the control system 195, or alternatively be automatically determined/ generated by the control system 195 where the stand count is tracked by the system, not the user.

At block 528, the control signal from the control circuit 220 to the MR fluid (i.e., to the electromagnet controlling the MR fluid) is updated to achieve the new damping constant. This may be maintained until another change to the drill string 155 as well as to the target damping constant occurs.

The method 500 continues from block 528 back to block 516, where during operation the impedance of the top drive 140 is matched generally to that of the drill string 155 in the current configuration, and stick-slip vibrations are absorbed as standing waves reach the saver sub 150. The method 500 may then continue as laid out above. Although described with respect to stands being added to a drill string 155, the same approach applies should stands (more generally, tubulars) be removed from the drill string 155 and drilling again commence. Further, in some embodiments the spring constant may change while the damping constant does not, or the damping constant may change while the spring constant does not, when a given tubular is added to, or removed from, the drill string 155.

Accordingly, embodiments of the present disclosure provide stick-slip mitigation stick-slip using an instrumented saver sub that is compatible across different top drives. This may enable the saver sub according to embodiments of the present disclosure to be tuned to the resonant frequency of the drill string every time that a new stand is connected to the drill string. As a result, stick-slip vibrations may be mitigated by the MR fluid's set properties in the saver sub. This approach of mitigating stick-slip may prolong the life of down-hole tools, require less tripping than existing approaches, and support more drilling. Further, embodiments of the present disclosure provide a solution that may apply across different top drives that would otherwise require extensive and expensive third-party interfacing.

In view of the above and the figures, one of ordinary skill in the art will readily recognize that the present disclosure introduces an apparatus comprising: a body comprising a fluid passage from a proximal end coupled to a top drive and a distal end coupled to the drill string; a spring associated with the body and comprising a shape-memory material, the shape-memory material comprising an adjustable spring constant configured to match an impedance of the top drive to a first drill string impedance of the drill string in a first drill string configuration; a damper associated with the body and comprising a magnetorheological (MR) fluid, the MR fluid comprising an adjustable damping constant configured to absorb the stick-slip vibrations of the drill string in the first drill string configuration; and a controller associated with the body and configured to receive an identified change to a second drill string configuration, reconfigure the spring constant to substantially match the impedance of the top drive to a second drill string impedance of the drill string in the second drill string configuration, or reconfigure the damping constant to absorb the stick-slip vibrations of the drill string in the second drill string configuration.

The apparatus may include wherein the spring further comprises a circuit configured to change a crystal property of the shape-memory material based on a signal received from the controller in response to the identified change, and the damper further comprises an electromagnetic (EM) coil configured to maintain a first EM field in the first drill string configuration and change to a second EM field in response to the identified change to the second drill string configuration. The apparatus may also include a slip ring configured to transfer power between an external power source and the saver sub. The apparatus may also include wherein the slip ring is configured to transfer power via induction to the saver sub, including the circuit, the EM coil, and the controller. The apparatus may also include wherein the body further comprises a battery configured to provide power to the controller, the spring, and the damper, the shape-memory material comprises a shape memory alloy, and the second drill string configuration comprises an addition of a new section of drill pipe to the drill string. The apparatus may also include wherein the spring comprises a torsional spring and the damper comprises a torsional damper, and the body comprises a proximal portion at a proximal end coupled to a top drive and a distal portion at a distal end coupled to the drill string, the proximal portion and the distal portion being coupled together with a roller bearing. The apparatus may also include wherein the spring comprises a linear spring and the damper comprises a linear damper, the body comprises a male portion at the proximal end and a female portion at the distal end configured to receive the male portion, the male and female portions coupled together in a helicoid configuration, and the helicoid configuration allows a telescoping movement of the male and female portions relative to each other within force limits allowed by the linear spring and linear damper.

The present disclosure also includes a method for mitigating stick-slip vibrations of a drill string using a saver sub, comprising: matching, by a spring of the saver sub that comprises a shape-memory material, an adjustable spring constant to an impedance of a top drive to a first drill string impedance of the drill string in a first drill string configuration; dampening, by a damper of the saver sub that comprises a magnetorheological (MR) fluid and an adjustable dampening constant, the stick-slip vibrations in the first drill string configuration; detecting, by a controller of the saver sub, an identified change from the first drill string configuration to a second drill string configuration having a second drill string impedance; and reconfiguring, by the controller, the adjustable spring constant to substantially match the second drill string impedance and the adjustable dampening constant to absorb the stick-slip vibrations of the drill string in the second drill string configuration.

The method may include wherein the identified change comprises a first identified change, further comprising detecting, by the controller, a second identified change from the second drill string configuration to a third drill string configuration having a third drill string impedance; and reconfiguring, by the controller, the adjustable spring constant to substantially match the third drill string impedance and the adjustable damping constant to absorb the stick-slip vibrations of the drill string in the third drill string configuration. The method may also include wherein the reconfiguring further comprises sending, by the controller, a first signal to the spring to change a crystal property of the shape-memory material in response to the identified change; sending, by the controller, a second signal to the damper to change an electromagnetic (EM) field of the damper from a first EM field to a second EM field in response to the identified change; and maintaining, by the controller, the second signal to the damper until an additional identified change is detected. The method may also include wherein the saver sub comprises a slip ring, the method further comprising receiving, by the controller, power from the slip ring provided from an external power source; and providing, by the controller, subsets of the power to the spring and the damper. The method may also include wherein the receiving further comprises receiving, by the controller, the power via an inductive power transfer. The method may also include wherein the detecting comprises receiving, by the controller, the identified change from an input received at a user interface; and translating, by the controller, the identified change to a first command for the spring and a second command for the damper. The method may also include wherein the detecting comprises receiving, by the controller, the identified change from a separate controller configured to automatically track individual drill pipe in the drill string; and translating, by the controller, the identified change to a first command for the spring and a second command for the damper.

The present disclosure also includes a drilling rig apparatus, comprising: a drill string comprising a plurality of drill pipe sections; a top drive configured to impart a rotation on the drill string during drilling operations; and a saver sub comprising: a spring comprising a shape-memory alloy, the shape-memory alloy comprising an adjustable spring constant configured in a first spring constant to match an impedance of the top drive to a first drill string impedance of the drill string with the plurality of drill pipe sections; a damper comprising a magnetorheological (MR) fluid, the MR fluid comprising an adjustable damping constant configured in a first damping constant to absorb stick-slip vibrations of the drill string with the plurality of drill pipe sections; and a controller configured to receive an input identifying a second spring constant and a second damping constant corresponding to an addition of a drill pipe to the plurality of drill pipe sections, wherein the controller is further configured to translate the second spring constant to a current for the shape-memory alloy to substantially match the impedance of the top drive to a second drill string impedance of the drill string with the addition of the drill pipe, and translate the second damping constant to an electromagnetic (EM) field value for the MR fluid to absorb the stick-slip vibrations of the drill string with the addition of the drill pipe.

The drilling rig apparatus also includes a user interface configured to receive the second spring constant and the second damping constant from a user based on a table associating different drill string lengths with different spring and damping constants; and a power source, wherein the saver sub further comprises a slip ring configured to transfer power between the power source and the controller. The drilling rig apparatus may also include wherein the spring of the saver sub further comprises a circuit configured to change a crystal property of the shape-memory material based on the current received from the controller, and the damper further comprises an EM coil configured to change an EM field by the EM coil to the EM field value received from the controller. The drilling rig apparatus may also include wherein the spring of the saver sub comprises a linear spring, and the damper of the saver sub comprises a linear damper. The drilling rig apparatus may also include wherein the saver sub further comprises a body comprising a male portion at a proximal end of the saver sub coupled to the top drive and a female portion at a distal end of the saver sub coupled to the drill string, the female portion configured to receive the male portion, and the body further comprising a fluid passage from the proximal end coupled to the top drive and the distal end coupled to the drill string, the male and female portions are coupled together in a helicoid configuration, and the helicoid configuration allows a telescoping movement of the male and female portions relative to each other within force limits allowed by the linear spring and linear damper. The drilling rig apparatus may also include wherein the saver sub is interoperable with a variety of top drives from different manufacturers.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to allow the reader to quickly ascertain the nature of the technical disclosure. It is submitted with the understanding that it will not be used to interpret or limit the scope or meaning of the claims.

Moreover, it is the express intention of the applicant not to invoke 35 U.S.C. § 112(f) for any limitations of any of the claims herein, except for those in which the claim expressly uses the word "means" together with an associated function.

What is claimed is:

1. A saver sub to mitigate stick-slip vibrations of a drill string, comprising:
   a body comprising a fluid passage from a proximal end coupled to a top drive and a distal end coupled to the drill string;
   a spring associated with the body and comprising a shape-memory material, the shape-memory material comprising an adjustable spring constant configured to match an impedance of the top drive to a first drill string impedance of the drill string in a first drill string configuration;
   a damper associated with the body and comprising a magnetorheological (MR) fluid, the MR fluid comprising an adjustable damping constant configured to absorb the stick-slip vibrations of the drill string in the first drill string configuration; and
   a controller associated with the body and configured to receive an identified change of the drill string from the first drill string configuration to a second drill string configuration, reconfigure the spring constant to substantially match the impedance of the top drive to a second drill string impedance of the drill string in the second drill string configuration, or reconfigure the damping constant to absorb the stick-slip vibrations of the drill string in the second drill string configuration.

2. The saver sub of claim 1, wherein:
   the spring further comprises a circuit configured to change a crystal property of the shape-memory material based on a signal received from the controller in response to the identified change, and
   the damper further comprises an electromagnetic (EM) coil configured to maintain a first EM field in the first drill string configuration and change to a second EM field in response to the identified change to the second drill string configuration.

3. The saver sub of claim 2, further comprising:
   a slip ring configured to transfer power between an external power source and the saver sub.

4. The saver sub of claim 3, wherein:
   the slip ring is configured to transfer power via induction to the saver sub, including the circuit, the EM coil, and the controller.

5. The saver sub of claim 1, wherein:
   the body further comprises a battery configured to provide power to the controller, the spring, and the damper,
   the shape-memory material comprises a shape memory alloy, and
   the second drill string configuration comprises an addition of a new section of drill pipe to the drill string.

6. The saver sub of claim 1, wherein:
   the spring comprises a torsional spring and the damper comprises a torsional damper, and
   the body comprises a proximal portion at a proximal end coupled to a top drive and a distal portion at a distal end coupled to the drill string, the proximal portion and the distal portion being coupled together with a roller bearing.

7. The saver sub of claim 1, wherein:
   the spring comprises a linear spring and the damper comprises a linear damper,
   the body comprises a male portion at the proximal end and a female portion at the distal end configured to receive the male portion, the male and female portions coupled together in a helicoid configuration, and
   the helicoid configuration allows a telescoping movement of the male and female portions relative to each other within force limits allowed by the linear spring and linear damper.

8. A method for mitigating stick-slip vibrations of a drill string using a saver sub, comprising:
   matching, by a spring of the saver sub that comprises a shape-memory material, an adjustable spring constant to an impedance of a top drive to a first drill string impedance of the drill string in a first drill string configuration;
   dampening, by a damper of the saver sub that comprises a magnetorheological (MR) fluid and an adjustable dampening constant, the stick-slip vibrations in the first drill string configuration;
   detecting, by a controller of the saver sub, an identified change of the drill string from the first drill string configuration to a second drill string configuration having a second drill string impedance; and reconfiguring, by the controller, the adjustable spring constant to substantially match the second drill string impedance and the adjustable dampening constant to absorb the stick-slip vibrations of the drill string in the second drill string configuration.

9. The method of claim 8, wherein the identified change comprises a first identified change, further comprising:

detecting, by the controller, a second identified change from the second drill string configuration to a third drill string configuration having a third drill string impedance; and reconfiguring, by the controller, the adjustable spring constant to substantially match the third drill string impedance and the adjustable damping constant to absorb the stick-slip vibrations of the drill string in the third drill string configuration.

10. The method of claim 8, wherein the reconfiguring further comprises:

sending, by the controller, a first signal to the spring to change a crystal property of the shape-memory material in response to the identified change;

sending, by the controller, a second signal to the damper to change an electromagnetic (EM) field of the damper from a first EM field to a second EM field in response to the identified change; and maintaining, by the controller, the second signal to the damper until an additional identified change is detected.

11. The method of claim 8, wherein the saver sub comprises a slip ring, the method further comprising:

receiving, by the controller, power from the slip ring provided from an external power source; and providing, by the controller, subsets of the power to the spring and the damper.

12. The method of claim 11, wherein the receiving further comprises:

receiving, by the controller, the power via an inductive power transfer.

13. The method of claim 8, wherein the detecting comprises:

receiving, by the controller, the identified change from an input received at a user interface; and translating, by the controller, the identified change to a first command for the spring and a second command for the damper.

14. The method of claim 8, wherein the detecting comprises:

receiving, by the controller, the identified change from a separate controller configured to automatically track individual drill pipe in the drill string; and translating, by the controller, the identified change to a first command for the spring and a second command for the damper.

15. A drilling rig apparatus, comprising:

a drill string comprising a plurality of drill pipe sections;
a top drive configured to impart a rotation on the drill string during drilling operations; and
a saver sub comprising:
a spring comprising a shape-memory material, the shape-memory material comprising an adjustable spring constant configured in a first spring constant to match an impedance of the top drive to a first drill string impedance of the drill string with the plurality of drill pipe sections;

a damper comprising a magnetorheological (MR) fluid, the MR fluid comprising an adjustable damping constant configured in a first damping constant to absorb stick-slip vibrations of the drill string with the plurality of drill pipe sections; and a controller configured to receive an input identifying a second spring constant and a second damping constant corresponding to an addition of a drill pipe to the plurality of drill pipe sections, wherein the controller is further configured to translate the second spring constant to a current for the shape-memory material to substantially match the impedance of the top drive to a second drill string impedance of the drill string with the addition of the drill pipe, and translate the second damping constant to an electromagnetic (EM) field value for the MR fluid to absorb the stick-slip vibrations of the drill string with the addition of the drill pipe.

16. The drilling rig apparatus of claim 15, further comprising:

a user interface configured to receive the second spring constant and the second damping constant from a user based on a table associating different drill string lengths with different spring and damping constants; and a power source, wherein the saver sub further comprises a slip ring configured to transfer power between the power source and the controller.

17. The drilling rig apparatus of claim 15, wherein:
the spring of the saver sub further comprises a circuit configured to change a crystal property of the shape-memory material based on the current received from the controller, and the damper further comprises an EM coil configured to change an EM field by the EM coil to the EM field value received from the controller.

18. The drilling rig apparatus of claim 15, wherein:
the spring of the saver sub comprises a linear spring, and
the damper of the saver sub comprises a linear damper.

19. The drilling rig apparatus of claim 18, wherein:
the saver sub further comprises a body comprising a male portion at a proximal end of the saver sub coupled to the top drive and a female portion at a distal end of the saver sub coupled to the drill string, the female portion configured to receive the male portion, and the body further comprising a fluid passage from the proximal end coupled to the top drive and the distal end coupled to the drill string, the male and female portions are coupled together in a helicoid configuration, and the helicoid configuration allows a telescoping movement of the male and female portions relative to each other within force limits allowed by the linear spring and linear damper.

20. The drilling rig apparatus of claim 15, wherein the saver sub is interoperable with a variety of top drives from different manufacturers.

* * * * *